US012626286B2

(12) United States Patent　　(10) Patent No.: US 12,626,286 B2
Kobayashi et al.　　(45) Date of Patent: May 12, 2026

(54) INFORMATION PROCESSING APPARATUS, INFORMATION PROCESSING METHOD, AND COMPUTER READABLE RECORDING MEDIUM

(71) Applicant: NEC Corporation, Tokyo (JP)

(72) Inventors: Masanori Kobayashi, Tokyo (JP); Akihiko Ichikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/511,122

(22) Filed: Nov. 16, 2023

(65) Prior Publication Data

US 2024/0086986 A1　　Mar. 14, 2024

Related U.S. Application Data

(63) Continuation of application No. 17/635,554, filed as application No. PCT/JP2020/010953 on Mar. 12, 2020, now abandoned.

(51) Int. Cl.
*G06Q 30/0601*　　(2023.01)
*G06Q 50/14*　　(2012.01)
(Continued)

(52) U.S. Cl.
CPC ......... *G06Q 30/0625* (2013.01); *G06Q 50/14* (2013.01); *G06T 7/70* (2017.01);
(Continued)

(58) Field of Classification Search
CPC ...... G06Q 30/0625; G06Q 50/14; G06T 7/70; G06V 40/172; G06V 20/53
(Continued)

(56) References Cited

U.S. PATENT DOCUMENTS

2011/0284627 A1　11/2011　Stefani
2012/0321145 A1 *　12/2012　Saito ................... G06F 16/5838
382/118
(Continued)

FOREIGN PATENT DOCUMENTS

AU　　2004250643 A1　12/2004
CA　　　2979754 A1 *　3/2018　.............. G06F 3/011
(Continued)

OTHER PUBLICATIONS

Umeki, Kazuhito et al. "Real-Time Congestion Estimation in Sight-seeing Spots with BLE Devices." 2018 IEEE International Conference on Pervasive Computing and Communications Workshops (PerCom Workshops). IEEE, 2018. 430-432. Web. (Year: 2018).*
(Continued)

*Primary Examiner* — Akiba K Robinson
(74) *Attorney, Agent, or Firm* — Sughrue Mion, PLLC

(57) ABSTRACT

An information processing apparatus acquires face image data of a passenger who has disembarked from an aircraft, and acquires flight information corresponding to the face image data acquired by an image capture device from a storage device in which flight information of the passenger and the face image data of the passenger are stored in association with each other in advance. It is determined based on the acquired flight information whether the passenger is a transit passenger. Sightseeing area information regarding the sightseeing area of the tour is acquired, and if the passenger is a transit passenger, a tour based on the sightseeing area information and flight information is searched for. The information of the searched-for tour is displayed on display devices.

8 Claims, 8 Drawing Sheets

(51) Int. Cl.
    *G06T 7/70*     (2017.01)
    *G06V 20/52*    (2022.01)
    *G06V 40/16*    (2022.01)

(52) U.S. Cl.
    CPC ............ *G06V 20/53* (2022.01); *G06V 40/172*
        (2022.01); *G06T 2207/30201* (2013.01); *G06T*
                    *2207/30242* (2013.01)

(58) Field of Classification Search
    USPC .................................................. 705/26.2, 1.1
    See application file for complete search history.

(56)              References Cited

U.S. PATENT DOCUMENTS

| | | |
|---|---|---|
| 2013/0070974 A1 | 3/2013 | Stefani |
| 2020/0125322 A1 | 4/2020 | Wilde |

FOREIGN PATENT DOCUMENTS

| | | | | |
|---|---|---|---|---|
| JP | 2007-079656 A | | 3/2007 | |
| JP | 2019-008375 A | | 1/2019 | |
| JP | 2021124362 A | * | 8/2021 | |
| JP | 6951935 B2 | * | 10/2021 | |
| WO | 90/00777 A1 | | 1/1990 | |
| WO | WO-201144890 A1 | * | 7/2021 | ............. G06Q 10/10 |

OTHER PUBLICATIONS

US Office Action for U.S. Appl. No. 17/635,554, mailed on Mar. 13, 2024.

International Search Report for PCT Application No. PCT/JP2020/010953, mailed on Sep. 15, 2020.

Expansion of Face Authentication Service Facilities for Nanki-Shirahama "IoT Hospitality Service Demonstration", [online], Oct. 25, 2019 [retrieved on Sep. 1, 2020], Internet:<URL:http:/shirahama-airport.jp/application/files/6515/7196/9665/PressRelease20191025_Iot-add5places.pdf>, pp. 1-4.

"Hospitality with Signage: Introductory Signage Set", [online], Feb. 2020 [retrieved on Sep. 1, 2020], Internet <URL:https://jpn.NEC.com/express/catalog/signage.pdf>, pp. 1-5.

Yamada Atsuko et al., "Emotion-Based Optimal Path Measurement and short trip Visualization System for Foreigners Visiting Japan", [online], Apr. 19, 2019, DEIM Forum 2019 (17th Annual Meeting of the Database Society of Japan), pp. 1-7.

"Turn Your Smartphone into an Overseas Travel Concierge!", [online], Nov. 3, 2018 [retrieved on Sep. 1, 2020], Internet:<URL:https://web.archive.org/web/20181103204744/https://prtimes.jp/main/html/rd/p/000000173.000003373.html>, pp. 1-2.

"Narita International Airport's New 'Hospitality' Business", Jan. 1, 2014, No. 16, pp. 120-121, (Project Design).

Miyakawa Yui et al., "Hub Airport Optimal Location Derivation Using Multi-Agent System", [CD-ROM], May 31, 2017, vol. 22, ISSN: 1342-145X, Proceedings of the Conference on Computational Engineering and Science, pp. 1-16.

English translation of Written opinion for PCT Application No. PCT/JP2020/010953, mailed on Sep. 15, 2020.

Extended European Search Report for EP Application No. 20924480.5, dated on Mar. 3, 2023.

JP Office Action for JP Application No. 2023-105212, mailed on Aug. 13, 2024 with English Translation.

"Inbound Sightseeing and a Dialog and Communication", [online], Mar. 7, 2019, [retrieved on Aug. 2, 2024], Internet: <URL: https://www.jttri.or.jp/members/journal/assets/no78_event02.pdf>.

US Office Action for U.S. Appl. No. 18/910,155, mailed on Jan. 16, 2026.

\* cited by examiner

Fig.4

OPTIMAL TOURS FOR MR./MS. AAA

1. XXX TOUR

AVAILABLE

——————————

——————————

2. YYY TOUR

LOCAL WEATHER CLEAR

TITLE: OPTIMAL TOURS FOR MR./MS. AAA

To : xxxx@aaa.com
From : xxxx@ccc.com

_____

1. XXX TOUR

AVAILABLE
————————————
————————————

2. YYY TOUR

EVENT BEING HELD
————————————
————————————

Fig.6

TOUR
INFORMATION http://www.aaaaa.aaa

OPTIMAL TOURS FOR MR./MS. AAA

1. XXX TOUR

AVAILABLE

_____

_____

2. YYY TOUR

EVENT BEING HELD

_____

1

INFORMATION PROCESSING APPARATUS, INFORMATION PROCESSING METHOD, AND COMPUTER READABLE RECORDING MEDIUM

CROSS REFERENCE TO RELATED APPLICATIONS

This application is a continuation of U.S. application Ser. No. 17/635,554 filed Feb. 15, 2022, which is a National Stage of International Application No. PCT/JP2020/10953 filed Mar. 12, 2020, the contents of all of which are incorporated herein by reference in their entirety.

TECHNICAL FIELD

The present invention relates to an information processing apparatus, an information processing method, and a computer readable recording medium.

BACKGROUND ART

Many display devices that display various types of information are installed in airport facilities. The display devices display flight information of an aircraft, information regarding airport facilities, information regarding a transportation system operating at the airport, and the like. If such a display device can display service contents suitable for individual passengers, each passenger can obtain a high degree of satisfaction. In view of this, as in Patent Document 1, a technique for displaying suitable information according to the user has been proposed. In Patent Document 1, attribute information (age, etc.) of a person is acquired from a captured face image of the person, and recommended products based on the attribute information are displayed.

LIST OF RELATED ART DOCUMENTS

Patent Document

Patent Document 1: Japanese Patent Laid-Open Application No. 2019-8375

SUMMARY OF INVENTION

Problems to be Solved by the Invention

Incidentally, in the case of an airport, and in particular, a hub airport, passengers stay at the airport for a long time due to aircraft transfer or the like in some cases. In this case, some passengers participate in tours at airports where they disembark for a transfer. By displaying information regarding the tour being held on the display device, it is possible to increase the degree of satisfaction of such passengers during their stay at the airport. However, as in Patent Document 1, even if a tour based on attributes of each passenger is selected and the passenger participates in the tour, the passenger may not be satisfied with the tour depending on the status of the destination of the tour.

In view of this, one example of an object of the present invention is to provide an information processing apparatus, an information processing method, and a computer readable recording medium that proposes an optimum tour for a passenger who has disembarked from an aircraft.

Means for Solving the Problems

In order to achieve the above-described object, an information processing apparatus in one aspect of the present invention includes:

a biological information acquisition unit configured to acquire biological information of a passenger who has disembarked from an aircraft;

a flight information acquisition unit configured to acquire flight information corresponding to the acquired biological information from a storage device in which the flight information of the passenger and the biological information of the passenger are stored in association with each other in advance;

a passenger determination unit configured to determine, based on the acquired flight information, whether the passenger is a passenger who is to re-board an aircraft after disembarking from the aircraft;

a sightseeing area information acquisition unit configured to acquire sightseeing area information regarding a sightseeing area of a tour;

a tour search unit configured to search for a tour in which the passenger can participate based on the sightseeing area information and the flight information if the passenger is a re-boarding passenger; and a display control unit configured to display information of the searched-for tour on a display device.

Also, in order to achieve the above-described object, an information processing method in one aspect of the present invention includes:

a step of acquiring biological information of a passenger who has disembarked from an aircraft;

a step of acquiring flight information corresponding to the acquired biological information from a storage device in which flight information of the passenger and the biological information of the passenger are stored in association with each other in advance;

a step of determining, based on the acquired flight information, whether the passenger is a passenger who is to re-board an aircraft after disembarking from the aircraft;

a step of acquiring sightseeing area information regarding a sightseeing area of a tour;

a step of searching for a tour in which the passenger can participate based on the sightseeing area information and the flight information if the passenger is a re-boarding passenger; and a step of displaying information of the searched-for tour on a display device.

Furthermore, in order to achieve the above-described object, a computer readable recording medium of an aspect of the present invention includes a program recorded thereon, the program including instructions that cause a computer to carry out:

a step of acquiring biological information of a passenger who has disembarked from an aircraft;

a step of acquiring flight information corresponding to the acquired biological information from a storage device in which flight information of the passenger and the biological information of the passenger are stored in association with each other in advance;

a step of determining, based on the acquired flight information, whether the passenger is a passenger who is to re-board an aircraft after disembarking from the aircraft;

a step of searching for a tour in which the passenger can participate if the passenger is a re-boarding passenger;

a step of acquiring sightseeing area information regarding a sightseeing area of a tour; and a step of searching for a tour in which the passenger can participate based on the sightseeing area information and the flight information if the passenger is a re-boarding passenger.

Advantageous Effects of the Invention

According to the present invention, it is possible to display an optimum tour for a passenger who has disembarked from an aircraft.

BRIEF DESCRIPTION OF THE DRAWINGS

FIG. 4 is a diagram showing an example of a display screen displayed on a display device installed at an airport.

FIG. 5 is a diagram showing an example of a display screen displayed on a display device owned by a passenger.

FIG. 6 is a diagram showing an example of a display screen displayed on the display device owned by the passenger.

EXAMPLE EMBODIMENTS

Hereinafter, an information processing apparatus, an information processing method, and a program according to an example embodiment of the present invention will be described with reference to FIGS. 1 to 8.

[Apparatus Configuration]

Figure 1:
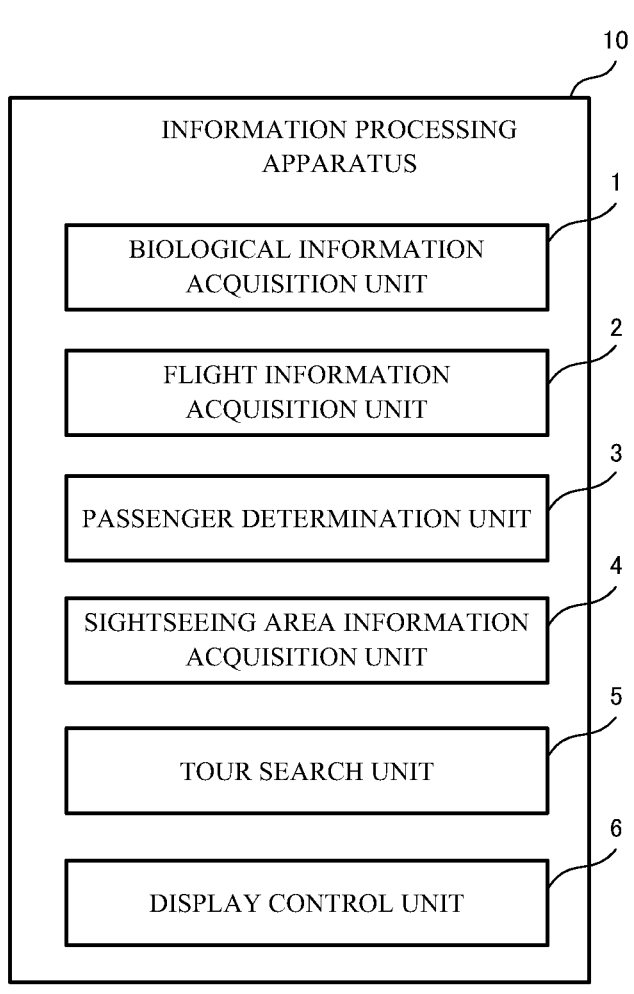
FIG. 1 is a block diagram showing a configuration of an information processing apparatus.

First, a configuration of the information processing apparatus according to the present example embodiment will be described with reference to FIG. 1. FIG. 1 is a block diagram showing a configuration of an information processing apparatus 10.

The information processing apparatus 10 is an apparatus that suggests an optimal tour for a passenger staying at an airport for a long time for transit or transfer. The information processing apparatus 10 includes a biological information acquisition unit 1, a flight information acquisition unit 2, a passenger determination unit 3, a sightseeing area information acquisition unit 4, a tour search unit 5, and a display control unit 6.

The biological information acquisition unit 1 acquires biological information of a passenger who has disembarked from an aircraft. The biological information includes face image data, fingerprint data, vocal cord data, iris data, and the like.

The flight information acquisition unit 2 acquires flight information corresponding to the biological information acquired by the biological information acquisition unit 1 from a storage device in which flight information of the passenger and biological information of the passenger are stored in association with each other in advance. The specific content of the flight information will be described later.

The passenger determination unit 3 determines whether the passenger is a passenger who is to re-board an aircraft after disembarking from an aircraft (hereinafter referred to as a transit passenger), based on the flight information acquired by the flight information acquisition unit 2.

The sightseeing area information acquisition unit 4 acquires sightseeing area information regarding the sightseeing area of the tour. The specific contents of the sightseeing area information will be described later.

If the passenger is a passenger who is to re-board, the tour search unit 5 searches for a tour in which the passenger can participate based on the sightseeing area information and the flight information.

The display control unit 6 displays information on the tour searched for by the tour search unit 5 on the display device.

When the passenger who has disembarked from the aircraft is a transit passenger, the information processing apparatus 10 having this configuration can display the optimum tour to the passenger. For example, transit passengers stay at the airport for a long time in some cases. For this reason, due to the information processing apparatus 10 proposing the tour information by displaying it to the transit passenger, the transit passenger can effectively spend his or her layover at the airport.

Next, the configuration of the information processing apparatus 10 in the present example embodiment will be described more specifically.

Figure 2:
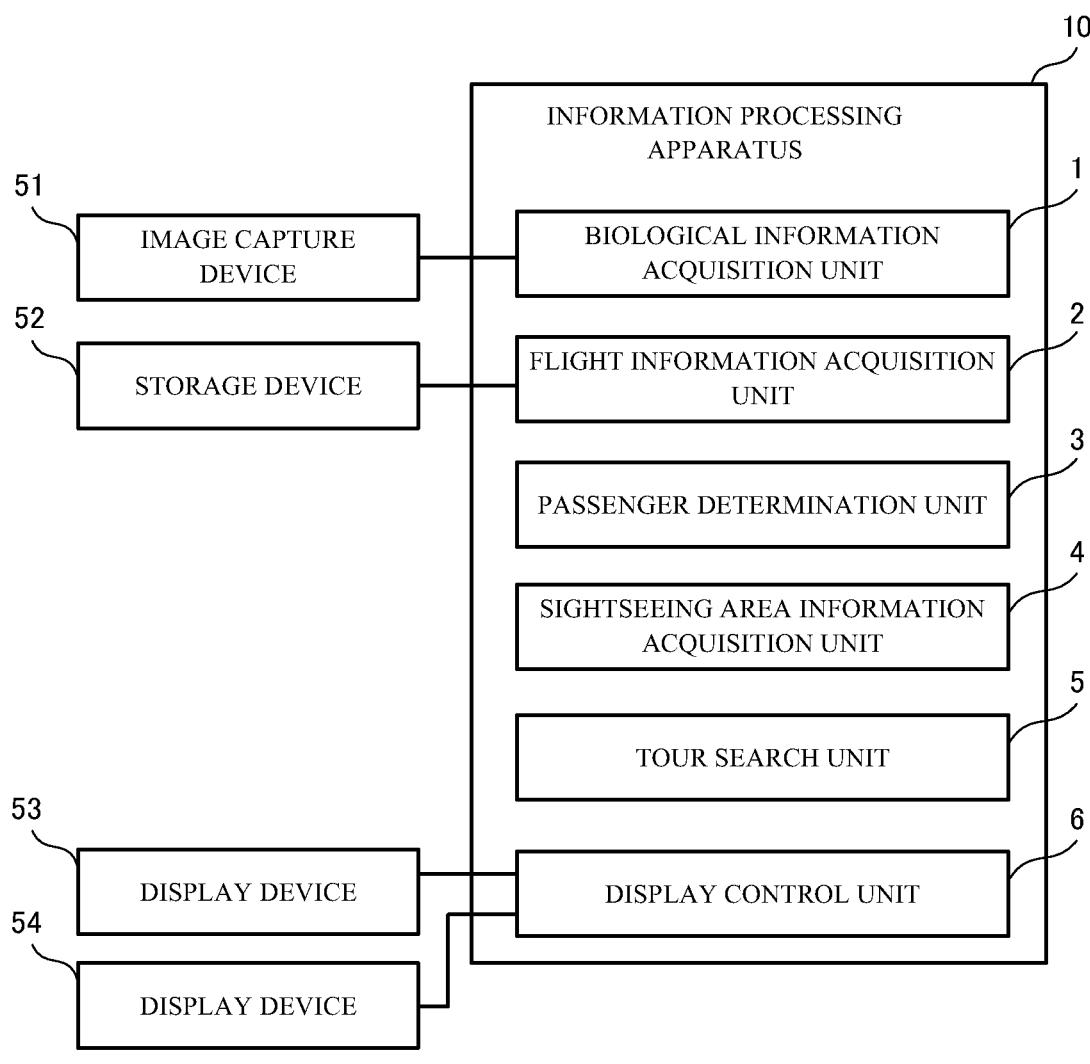
FIG. 2 is a block diagram for specifically illustrating the information processing apparatus.
Figure 3:
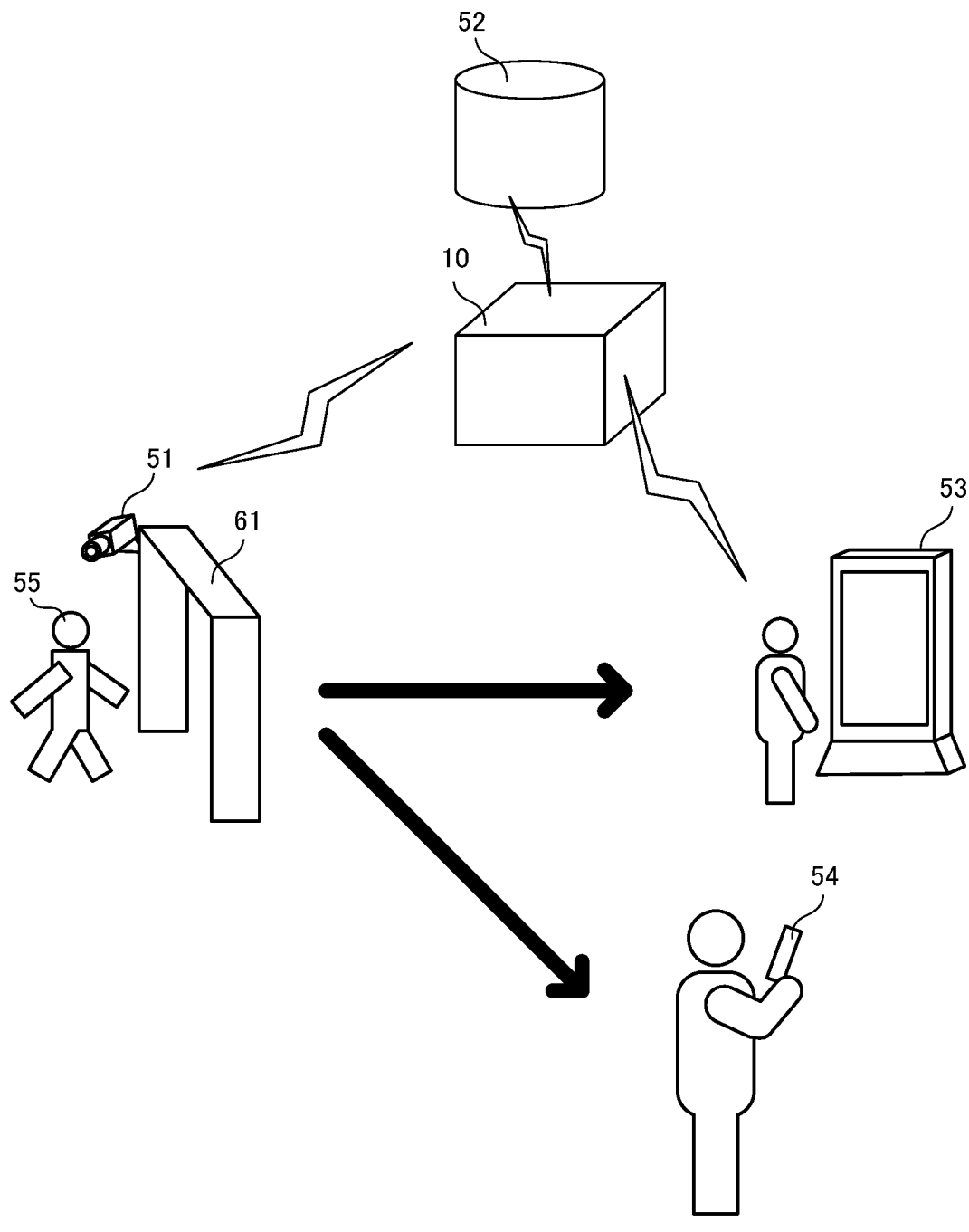
FIG. 3 is a diagram for illustrating information display performed by the information processing apparatus.

FIG. 2 is a block diagram for specifically describing the information processing apparatus 10. FIG. 3 is a diagram for describing information display performed by the information processing apparatus 10. Hereinafter, biological information will be described as face image data.

The information processing apparatus 10 is connected to an image capture device 51, a storage device 52, and a display device 53 so as to be capable of data communication therewith.

The image capture device 51 is a device that is installed in an airport facility and captures an image of the face of the passenger 55. The image capture device 51 is installed at a location where an image of the face of the passenger 55 who has disembarked from an aircraft can be captured, such as an arrival gate or a baggage claim area of the airport. FIG. 3 shows a state in which the image capture device 51 is provided at an arrival gate 61 and captures an image of the face of the passenger 55 passing through the arrival gate 61.

The storage device 52 stores identification information of the passenger 55 and face image data of the passenger 55 in association with each other. The identification information includes unique information and flight information. The unique information is passport information, an e-mail address, and the like of the passenger 55. The passport information includes a name, nationality, gender, passport number, and so on. The flight information is information on a destination, transit point, departure and arrival times of the aircraft, and the like of the passenger 55. The flight information need only include at least information according to which it is possible to determine that the passenger 55 is a transit passenger, for example, information on the destination of the passenger 55, information on the departure and arrival of the aircraft to be boarded, and the like, and the information included in the flight information is not limited to the above.

For example, during check-in at the departure airport, identity confirmation is performed by matching the passport of passenger 55 and the face image data, and then the face image data, flight information, and unique information are associated with each other and registered in the storage device 52. The passenger 55 is registered, for example, using a dedicated terminal installed at the airport. This makes it possible to confirm the identity by capturing an image of the face of the passenger 55 at each touch point after check-in. At each touch point, when an image of the face is captured, the face image data of the passenger 55 is selected from the storage device 52 through one-to-N matching using the captured face image data. By acquiring the unique information and flight information corresponding to the selected face image data, identity confirmation is performed at each touch point. Note that it is possible to manage the procedure status of passenger 55 due to being able to confirm the identity through face recognition at each touch point.

The information processing apparatus 10 or another apparatus may perform various procedures through face recognition and the processing for storage in the storage device. Also, in the above description, the face image data, the unique information, and the flight information are registered in the storage device 52 during check-in, but the timing of registration in the storage device 52 is not limited to this. For example, the passenger 55 may store the unique information, the flight information, and the face image data in association with each other in advance using a dedicated application of a mobile terminal such as a smartphone, a dedicated website, or the like.

The display device 53 is installed in the airport, for example, near the arrival gate 61. The display device 53 is, for example, a liquid crystal display device, and displays various types of information. Note that the display device 53 may be provided in one piece with an image capture device, or may be provided with an image capture device separately from the display device 53 in cooperation with the display device 53 to capture the face of the passenger 55 looking at the display device 53.

The information processing apparatus 10 and the storage device 52 are connected to a network, and the installation location may be in the airport or in a facility other than the airport.

Also, the information processing apparatus 10 can transmit data to the display device 54. The display device 54 is, for example, a smartphone, a tablet terminal, a PC (personal computer), or the like owned by the passenger 55. The information processing apparatus 10 transmits an e-mail to the display device 54 using the e-mail address included in the unique information obtained by capturing an image of the face of the passenger 55.

As described above, the information processing apparatus 10 includes the biological information acquisition unit 1, the flight information acquisition unit 2, the passenger determination unit 3, the sightseeing area information acquisition unit 4, the tour search unit 5, and the display control unit 6.

The biological information acquisition unit 1 acquires face image data of the passenger 55 from the image capture device 51. For example, as shown in FIG. 3, when the passenger 55 passes through the arrival gate 61, the image capture device 51 captures an image of the face of the passenger 55. The biological information acquisition unit 1 acquires face image data of the passenger 55 passing through the arrival gate 61. Note that if the display device 53 is provided with an image capture device, the biological information acquisition unit 1 may acquire face image data of the passenger 55 captured when the passenger 55 looks at the display device 53.

When the biological information acquisition unit 1 acquires the face image data, the flight information acquisition unit 2 selects the face image data from the storage device 52 through one-to-N matching using the face image data. The flight information acquisition unit 2 acquires the identification information associated with the selected face image data from the storage device 52. The identification information includes the flight information. The flight information acquisition unit 2 acquires the flight information by acquiring the identification information.

The passenger determination unit 3 determines whether the passenger 55 whose image was captured by the biological information acquisition unit 1 is a transit passenger based on the flight information acquired by the flight information acquisition unit 2. For example, the passenger determination unit 3 determines whether the airport at which the image of the passenger 55 was captured (the airport where the image capture device 51 is installed) is the destination of the passenger 55 included in the flight information. If it is not the destination, the passenger determination unit 3 determines that the passenger 55 is a transit passenger.

Note that transit passengers include passengers who are to re-board an aircraft different from the one they disembarked from, and passengers who are to re-board the same aircraft as the one they disembarked from.

The tour search unit 5 searches for a tour in which the passenger 55 can participate. A tour that can be participated in is a tour that is being held on the current day. Note that the tour search unit 5 may estimate the time for which the passenger 55 is to stay at the airport based on the flight information, and may search for a tour that will be completed within the stay time from among the tours being held on the current day. The stay time is, for example, the time from the current time until the transfer flight to be re-boarded starts boarding. The tour search unit 5 may search for a tour by having a tour provider provide information, or may store the information in the storage device 52 and search from the storage device 52.

The sightseeing area information acquisition unit 4 acquires sightseeing area information of the tour searched for by the tour search unit 5. It should be noted that a tour may be designated in advance, and the sightseeing area information acquisition unit 4 may acquire the sightseeing area information of the designated tour. The sightseeing area information is information about the sightseeing area that is the destination of the tour, and is, for example, information such as the degree of congestion of the sightseeing area, the weather, an event being held at the sightseeing area, and traffic conditions around the sightseeing area.

The degree of congestion of the sightseeing area may be the degree of concentration of people at the sightseeing area regardless of the tour, or may be the number of participants in the tour to the sightseeing area. There are various methods for acquiring the degree of congestion of the sightseeing area by the sightseeing area information acquisition unit 4.

For example, the sightseeing area information acquisition unit 4 detects a human face through image recognition from image data captured by an image capture device installed at a sightseeing area. Then, the sightseeing area information acquisition unit 4 may acquire the number of people detected per visual field of the image capture device as the degree of concentration (degree of congestion). Alternatively, the sightseeing area information acquisition unit 4 may acquire the number of people detected through image recognition as the degree of congestion. Alternatively, the sightseeing area information acquisition unit 4 may receive the congestion status directly from a manager or a related person of the sightseeing area or the like and acquire the congestion status according to human senses (the number of people per predetermined area, such as 10 m$^2$) as the degree of congestion.

Alternatively, the sightseeing area information acquisition unit 4 may acquire the number of participants in the tour searched for by the tour search unit 5 as the degree of congestion. The number of participants in the tour may be, for example, the number of people who have previously applied for the tour to be proposed to passenger 55, or the number of people who are participating in tours to the same sightseeing area. Also, face image data is registered for transit passengers at the airport. For this reason, the transit passengers at the sightseeing area can be ascertained through face recognition using face image data captured by an image capture device installed at the sightseeing area. Also, the number of participants in the tour may be the number of ascertained transit passengers.

Also, the sightseeing area information acquisition unit 4 may calculate the degree of congestion by counting the number of payments made through face recognition at a shop or the like at the airport or the sightseeing area, or the number of instances of face recognition performed by signage or the like having an image capture device, installed at the sightseeing area. Furthermore, the sightseeing area information acquisition unit 4 may calculate a predicted value of the degree of congestion using statistical information or machine learning.

The weather information includes information regarding atmospheric conditions such as the current weather, air pressure, wind direction, wind speed, temperature, and humidity, as well as information on the probability of future precipitation. This weather information, and information on events, surrounding traffic conditions, and the like can be acquired from an external information provider or the like.

The tour search unit 5 selects a tour based on the sightseeing area information acquired by the sightseeing area information acquisition unit 4, from the tours searched for by the tour search unit 5 based on the flight information.

If a tour is to be selected based on the degree of congestion, the tour search unit 5 does not select a tour when, for example, the degree of congestion exceeds a predetermined value. Alternatively, it is assumed that a rule is set in advance such that if the degree of congestion is a "first value to a second value", a "tour A" is selected, and if the degree of congestion is "a second value to a third value", a "tour B" is selected. Then, if the tour corresponding to the degree of congestion acquired by the sightseeing area information acquisition unit 4 in the rule is searched for by the tour search unit 5, the tour search unit 5 selects the tour as a tour to be suggested to the passenger 55.

Note that if the degree of congestion is less than a predetermined value, the tour search unit 5 may not select the tour because the destination is inactive.

If a tour is to be selected based on weather information, the tour search unit 5 does not select a tour if the current situation is rain, the probability of precipitation exceeds a predetermined value, the temperature exceeds a predetermined temperature, the wind power exceeds a predetermined value, or the like. Also, if a tour corresponding to the weather information (e.g., the probability of precipitation) acquired by the sightseeing area information acquisition unit 4 is searched for according to a pre-set rule as in the case of the degree of congestion, the tour search unit 5 selects the tour as a tour to suggest to the passenger 55.

When selecting based on traffic conditions, the tour search unit 5 calculates the round-trip time between the airport and the sightseeing area. Then, the tour search unit 5 selects a tour in which the time obtained by subtracting the round-trip time from the staying time at the airport of the passenger 55 is greater than or equal to a predetermined value. Alternatively, if the time is less than the predetermined value, the stay time at the sightseeing area will be short, and therefore the tour is not selected.

When selecting based on information on an event held at the sightseeing area, the tour search unit 5 preferentially selects a tour in which an event is held.

It should be noted that the tour search unit 5 can appropriately change which sightseeing area information to base the selection of the tour on. Selection may be performed prioritizing the degree of congestion or prioritizing the weather. Also, a tour may be selected by combining a plurality of pieces of information, for example, the degree of congestion and the probability of precipitation. In this case, for example, a correspondence rule such as selecting a tour A if the degree of congestion is "50%" and the probability of precipitation is "30% or more" and selecting a tour B if the degree of congestion is "80%" and the probability of precipitation is "30% or more" is set in advance. Then, if the corresponding tour is searched for, the tour search unit 5 selects the tour as a tour to be suggested to the passenger 55.

The display control unit 6 suggests the tour to the passenger 55 by displaying the information of the tour searched for and selected by the tour search unit 5 on the display device 53, or transmitting it to the display device 54 owned by the passenger 55 by e-mail.

Figure 4:
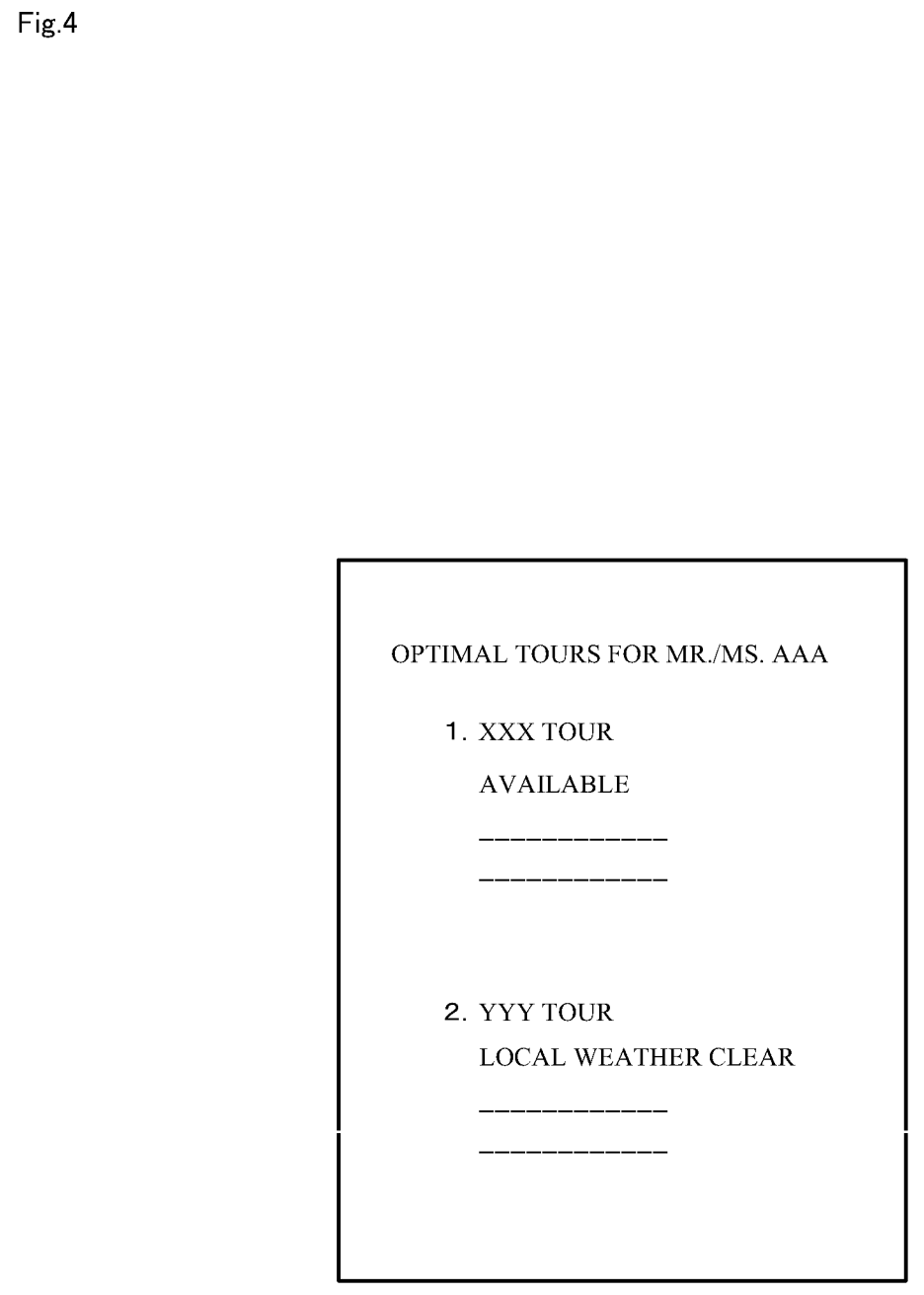

FIG. 4 is a diagram showing an example of a display screen displayed on the display device 53 installed at the airport.

If the passenger 55 disembarking from the aircraft is a transit passenger, the display control unit 6 suggests a tour to the passenger 55 by displaying information of the tour on the display device 53 as shown in FIG. 4. FIG. 4 is an example of a display screen including information on a tour selected based on the degree of congestion of the destination of the tour and a tour selected based on the weather of the destination. Note that if the display device 53 is, for example, a touch panel type, more detailed information may be displayed when the displayed tour information is selected.

Figure 5:
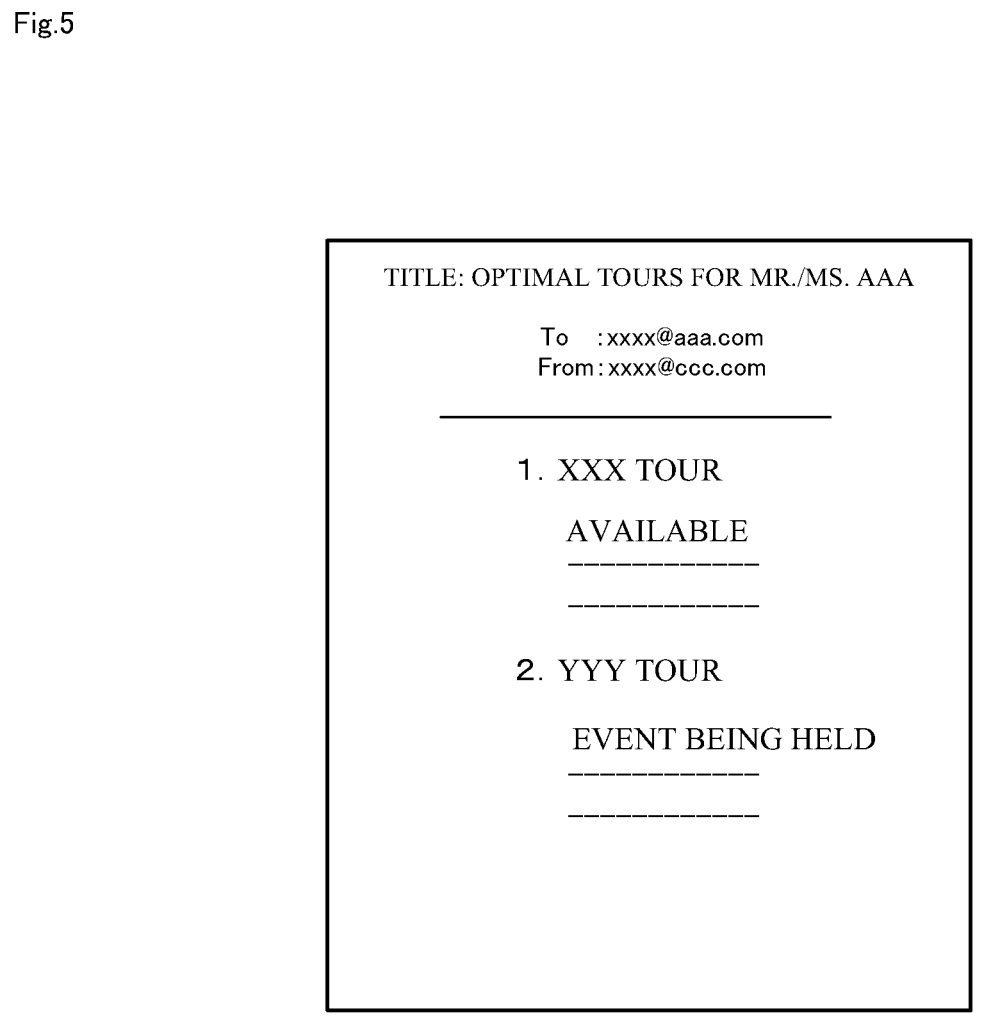
Figure 6:
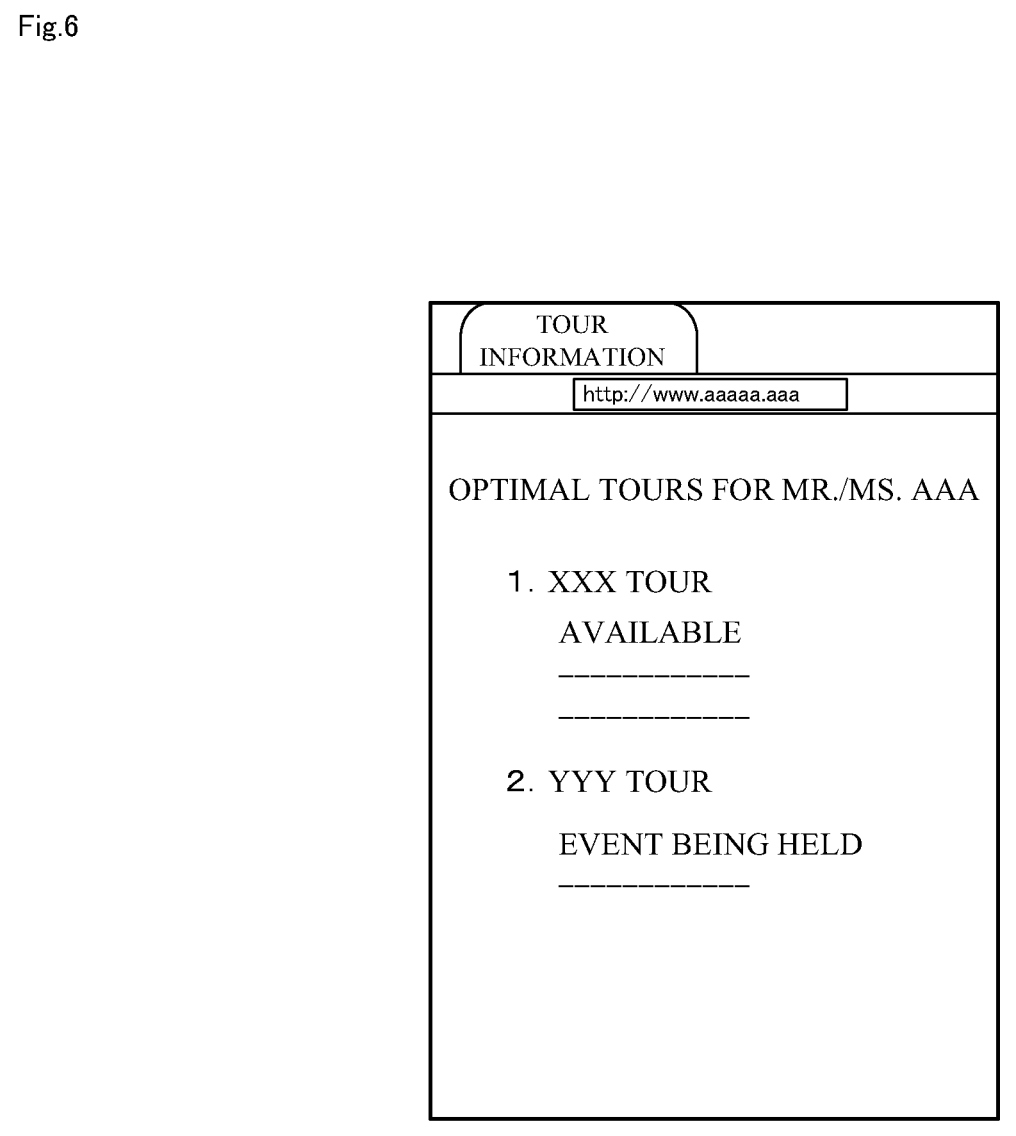

FIGS. 5 and 6 are diagrams showing an example of a display screen displayed on the display device 54 owned by the passenger 55. FIGS. 5 and 6 are examples of display screens including information on tours selected based on the degree of congestion of the sightseeing area of the tour and information on tours selected based on the event of the sightseeing area. Note that when the tour information displayed on the display device 54 is selected, more detailed information may be displayed.

The display control unit 6 transmits an e-mail including the tour information to the display device 54 based on an e-mail address included in the unique information. As a result, a mail screen as shown in FIG. 5 is displayed on the display device 54. Note that when the displayed tour is selected on the mail screen shown in FIG. 5, a website displaying the detailed information may be accessed.

Alternatively, the display control unit 6 transmits the address of the website displaying the tour information to the display device 54 by e-mail. The owner (passenger 55) of the display device 54 taps (clicks on) the address included in the e-mail to display the website screen as shown in FIG. 6.

Note that the display control unit 6 may also include accompanying information in the display screens shown in FIGS. 4 to 6. The accompanying information is, for example, the age group, gender, nationality, and the like of the tour participants. The passenger 55 can further narrow down the tours that suit the passenger 55 from the suggested tours by looking at the accompanying information.

[Apparatus Operation]

Figure 7:
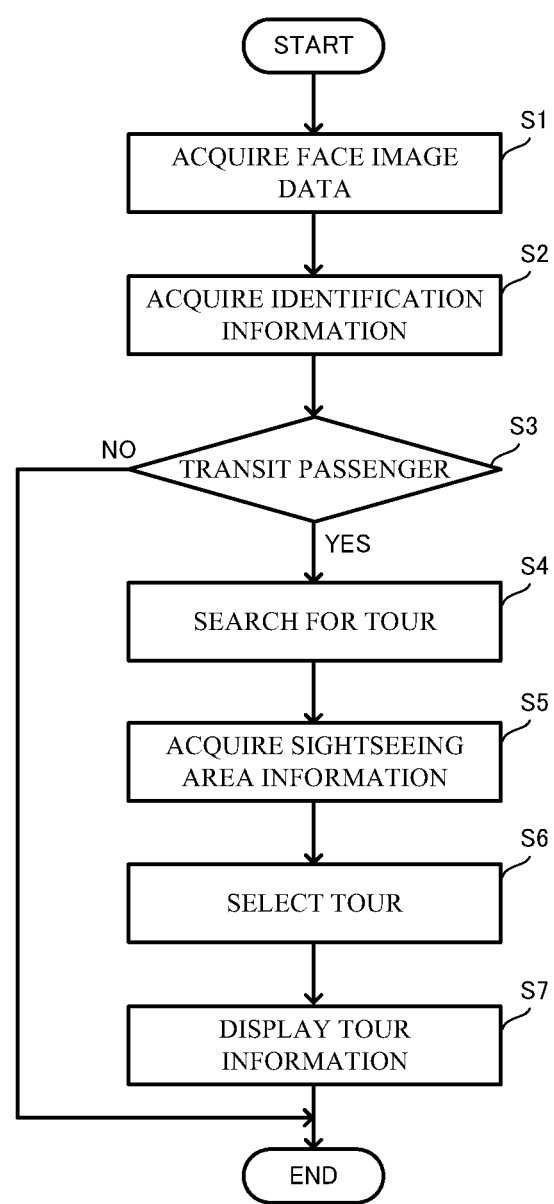
FIG. 7 is a flowchart showing the operation of the information processing apparatus.

Next, the operation of the information processing apparatus 10 in the present example embodiment will be described with reference to FIG. 7. FIG. 7 is a flow chart showing the operation of the information processing apparatus 10. In the following description, FIGS. 1 to 6 will be referred to as appropriate. Also, in the present example embodiment, the status notification method is implemented by operating the information processing apparatus 10. Accordingly, the description of the information processing method in this example embodiment is replaced with the following description of the operation of the information processing apparatus 10. Also, in the description of FIG. 7, the biological information is face image data.

The biological information acquisition unit 1 acquires face image data captured by the image capture device 51 (51). The flight information acquisition unit 2 acquires the flight information by acquiring the identification information corresponding to the face image data from the storage device 52 (S2). The passenger determination unit 3 determines whether the passenger 55 in the face image data is a transit passenger based on the flight information acquired in S2 (S3).

If the passenger 55 is a transit passenger (S3: YES), the tour search unit 5 searches for a tour held on the current day (S4). The sightseeing area information acquisition unit 4 acquires sightseeing area information regarding the sightseeing area of the tour that was searched for (S5).

The tour search unit 5 selects a tour from the tours searched for by the tour search unit 5 based on the sightseeing area information (S6). The display control unit 6 displays the information of the selected tour on the display devices 53 and 54 (S7). When displaying on the display device 54, the display control unit 6 transmits an e-mail including the information to be displayed or an e-mail including the address of the website on which the information is displayed to the display device 54. In this case, by acquiring the identification information acquired in S2, the unique information is acquired, and an e-mail is transmitted based on the e mail address included in the unique information.

If the passenger 55 is not a transit passenger (S3: NO), this flow ends without any processing such as searching for a tour being executed.

[Program]

The program in this example embodiment may be any program that causes a computer to execute steps S1 to S7 shown in FIG. 7. By installing and executing this program on a computer, the information processing apparatus 10 and the information processing method according to the present example embodiment can be realized. In this case, the processor of the computer functions as the biological information acquisition unit 1, the flight information acquisition unit 2, the passenger determination unit 3, the sightseeing area information acquisition unit 4, the tour search unit 5, and the display control unit 6 and performs processing.

Note that if the computer on which the program of the present example embodiment is installed functions as the display control unit 6, the program of the present example embodiment may be a program that causes the computer to execute steps S1 to S6 shown in FIG. 7. That is, if the computer on which the program is installed has a function of displaying the generated information, the program of the present example embodiment may cause the computer to generate the tour information, and the screen display on the display devices 53 and 54 may use an existing display function.

Also, the program in the present example embodiment may be executed by a computer system constructed by a plurality of computers. In this case, for example, each computer may function as any one of the biological information acquisition unit 1, the flight information acquisition unit 2, the passenger determination unit 3, the sightseeing area information acquisition unit 4, the tour search unit 5, and the display control unit 6.

In addition to general-purpose PCs, examples of computers include smartphones and tablet terminal devices.

(Physical Configuration of the Device)

Figure 8:
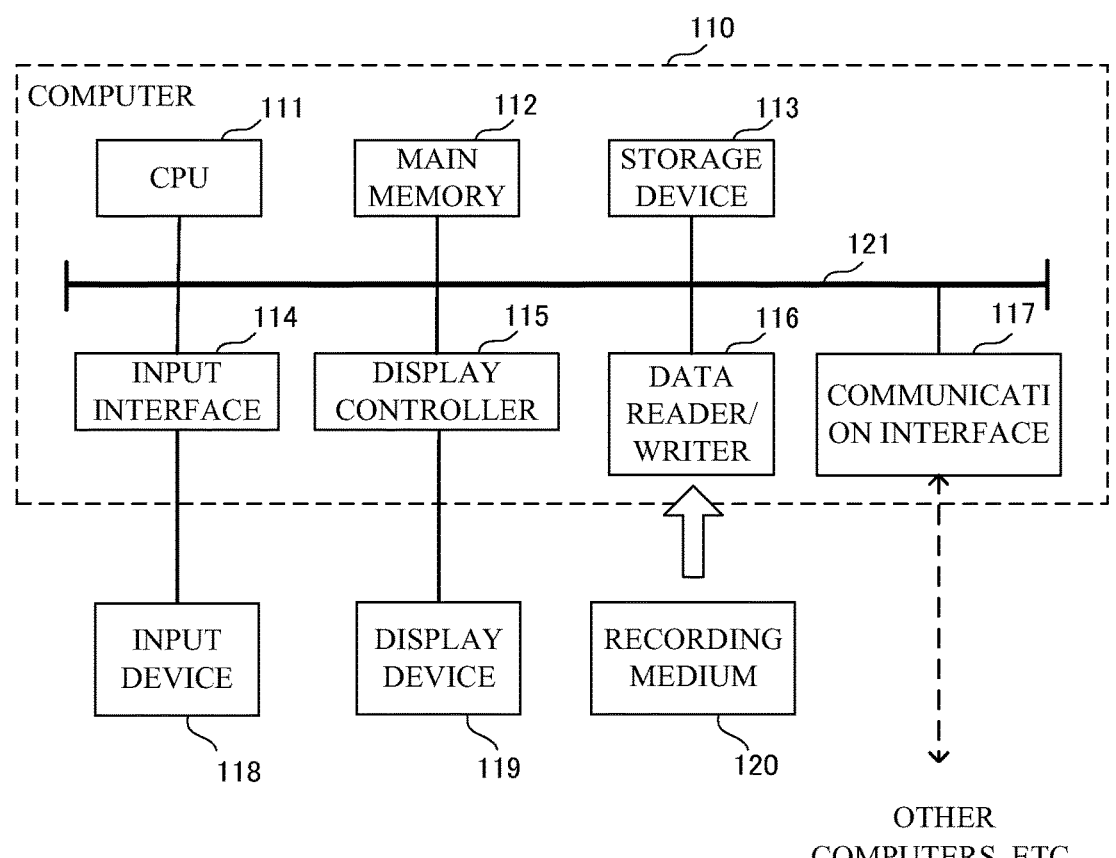
FIG. 8 is a block diagram showing an example of a computer that realizes an information processing apparatus.

Here, a computer that realizes the information processing apparatus 10 by executing the program in the example embodiment will be described with reference to FIG. 8. FIG. 8 is a block diagram showing an example of a computer that realizes the information processing apparatus 10.

As shown in FIG. 8, the computer 110 includes a CPU (Central Processing Unit) 111, a main memory 112, a storage device 113, an input interface 114, a display controller 115, a data reader/writer 116, and a communication interface 117. These units are connected to each other via a bus 121 so as to be capable of data communication. Note that the computer 110 may include a GPU (Graphics Processing Unit) or an FPGA (Field-Programmable Gate Array) in addition to the CPU 111 or in place of the CPU 111.

The CPU 111 loads the program (codes) of the present example embodiment stored in the storage device 113 into the main memory 112 and executes the program in a predetermined order to perform various computations. The main memory 112 is typically a volatile storage device such as a DRAM (Dynamic Random Access Memory). Also, the program according to the present example embodiment is provided in a state of being stored in a computer readable recording medium 120. Note that the program according to the present example embodiment may also be distributed on the Internet, which is connected to via the communication interface 117.

Also, specific examples of the storage device 113 may include a semiconductor storage device such as a flash memory in addition to a hard disk. The input interface 114 mediates data transmission between the CPU 111 and input devices 118 such as a keyboard and mouse. The display controller 115 is connected to a display device 119 and controls the display on the display device 119. The data reader/writer 116 mediates data transmission between the CPU 111 and the recording medium 120, reads out the program from the recording medium 120, and writes the result of processing performed by the computer 110 in the recording medium 120. The communication interface 117 mediates data transmission between the CPU 111 and another computer.

Specific examples of the recording medium 120 include a general-purpose semiconductor storage device such as a CF (Compact Flash (registered trademark)) or an SD (Secure Digital), a magnetic storage medium such as a Flexible Disk, and an optical storage medium such as a CD-ROM (Compact Disk Read Only Memory).

A portion or all of the above-described example embodiment can be expressed by (Supplementary note 1) to (Supplementary note 36) described below, but is not limited thereto.

(Supplementary note 1)

An information processing apparatus including:

a biological information acquisition unit configured to acquire biological information of a passenger who has disembarked from an aircraft;

a flight information acquisition unit configured to acquire flight information corresponding to the acquired biological information from a storage device in which the flight information of the passenger and the biological information of the passenger are stored in association with each other in advance;

a passenger determination unit configured to determine, based on the acquired flight information, whether the passenger is a passenger who is to re-board an aircraft after disembarking from the aircraft;

a sightseeing area information acquisition unit configured to acquire sightseeing area information regarding a sightseeing area of a tour;

a tour search unit configured to search for a tour in which the passenger can participate based on the sightseeing area information and the flight information if the passenger is a re-boarding passenger; and a display control unit configured to display information of the searched-for tour on a display device.

(Supplementary note 2)

The information processing apparatus according to supplementary note 1, in which the sightseeing area information is a degree of congestion of a sightseeing area of the tour.

(Supplementary note 3)

The information processing apparatus according to supplementary note 2, in which the degree of congestion is a degree of concentration of people at the sightseeing area of the tour.

(Supplementary note 4)

The information processing apparatus according to supplementary note 3, in which the degree of congestion is the number of people detected per viewing field of an image capture device installed at the sightseeing area by detecting faces of people through image recognition based on image data captured by the image capture device.

(Supplementary note 5)

The information processing apparatus according to supplementary note 3, in which the degree of congestion is the number of people per predetermined area, which is judged by a person.

(Supplementary note 6)

The information processing apparatus according to supplementary note 2, in which the degree of congestion is the number of people participating in the tour.

(Supplementary note 7)

The information processing apparatus according to supplementary note 2, in which the degree of congestion is the number of people participating in tours for which a sightseeing area is the same.

(Supplementary note 8)

The information processing apparatus according to supplementary note 2, in which the degree of congestion is the number of payments performed through face recognition at an airport or the sightseeing area.

(Supplementary note 9)

The information processing apparatus according to supplementary note 2, in which the degree of congestion is the number of instances of face recognition performed at the sightseeing area.

(Supplementary note 10)

The information processing apparatus according to any one of supplementary notes 1 to 9, in which the tour search unit acquires a stay time of the passenger at an airport from the flight information, and determines a tour suitable for the passenger based on the stay time.

(Supplementary note 11)

The information processing apparatus according to supplementary note 10, in which the tour search unit acquires a round-trip time between the airport and a tour destination and determines a tour for which a time obtained by subtracting the round-trip time from the stay time is a predetermined value or more.

(Supplementary note 12)

The information processing apparatus according to any one of supplementary notes 1 to 11, in which the biological information is face image data.

(Supplementary note 13)

An information processing method including:

a step of acquiring biological information of a passenger who has disembarked from an aircraft;

a step of acquiring flight information corresponding to the acquired biological information from a storage device in which the flight information of the passenger and the biological information of the passenger are stored in association with each other in advance;

a step of determining, based on the acquired flight information, whether the passenger is a passenger who is to re-board an aircraft after disembarking from the aircraft;

a step of acquiring sightseeing area information regarding a sightseeing area of a tour;

a step of searching for a tour in which the passenger can participate based on the sightseeing area information and the flight information if the passenger is a re-boarding passenger; and a step of displaying information of the searched-for tour on a display device.

(Supplementary note 14)

The information processing method according to supplementary note 13, in which the sightseeing area information is a degree of congestion of a sightseeing area of the tour.

(Supplementary note 15)

The information processing method according to supplementary note 14, in which the degree of congestion is a degree of concentration of people at the sightseeing area of the tour.

(Supplementary note 16)

The information processing method according to supplementary note 15, in which the degree of concentration is the number of people detected per viewing field of an image capture device installed at the sightseeing area by detecting faces of people through image recognition based on image data captured by the image capture device.

(Supplementary note 17)

The information processing method according to supplementary note 15, in which the degree of concentration is the number of people per predetermined area, which is judged by a person.

(Supplementary note 18)

The information processing method according to supplementary note 14, in which the degree of congestion is the number of people participating in the tour.

(Supplementary note 19)

The information processing method according to supplementary note 14, in which the degree of congestion is the number of people participating in tours for which a sightseeing area is the same.

(Supplementary note 20)

The information processing method according to supplementary note 14, in which the degree of congestion is the number of payments performed through face recognition at an airport or the sightseeing area.

(Supplementary note 21)

The information processing method according to supplementary note 14, in which the degree of congestion is the number of instances of face recognition performed at the sightseeing area.

(Supplementary note 22)

The information processing method according to any one of supplementary notes 13 to 21, in which, in the step of searching for the tour, a stay time of the passenger at an airport is acquired from the flight information, and a tour suitable for the passenger is determined based on the stay time.

(Supplementary note 23)

The information processing method according to supplementary note 22, in which, in the step of searching for the tour, a round-trip time between the airport and a tour destination is acquired and a tour for which a time obtained by subtracting the round-trip time from the stay time is a predetermined value or more is determined.

(Supplementary note 24)

The information processing method according to any one of supplementary notes 13 to 23, in which the biological information is face image data.

(Supplementary note 25)

A computer readable recording medium that includes a program recorded thereon, the program including instructions that cause a computer to carry out:

a step of acquiring biological information of a passenger who has disembarked from an aircraft;

a step of acquiring flight information corresponding to the acquired biological information from a storage device in which the flight information of the passenger and the biological information of the passenger are stored in association with each other in advance;

a step of determining, based on the acquired flight information, whether the passenger is a passenger who is to re-board an aircraft after disembarking from the aircraft;

a step of acquiring sightseeing area information regarding a sightseeing area of a tour; and a step of searching for a tour in which the passenger can participate based on the sightseeing area information and the flight information if the passenger is a re-boarding passenger.

(Supplementary note 26)

The computer readable recording medium according to supplementary note 25, in which the sightseeing area information is a degree of congestion of a sightseeing area of the tour.

(Supplementary note 27)

The computer readable recording medium according to supplementary note 26, in which the degree of congestion is a degree of concentration of people at the sightseeing area of the tour.

(Supplementary note 28)

The computer readable recording medium according to supplementary note 27, in which the degree of concentration is the number of people detected per viewing field of an image capture device installed at the sightseeing area by detecting faces of people through image recognition based on image data captured by the image capture device.

(Supplementary note 29)

The computer readable recording medium according to supplementary note 27, in which the degree of concentration is the number of people per predetermined area, which is judged by a person.

(Supplementary note 30)

The computer readable recording medium according to supplementary note 26, in which the degree of congestion is the number of people participating in the tour.

(Supplementary note 31)

The computer readable recording medium according to supplementary note 26, in which the degree of congestion is the number of people participating in tours for which a sightseeing area is the same.

(Supplementary note 32)

The computer readable recording medium according to supplementary note 26, in which the degree of congestion is the number of payments performed through face recognition at an airport or the sightseeing area.

(Supplementary note 33)

The computer readable recording medium according to supplementary note 26, in which the degree of congestion is the number of instances of face recognition performed at the sightseeing area.

(Supplementary note 34)

The computer readable recording medium according to any one of supplementary notes 25 to 33, in which, in the step of searching for the tour, a stay time of the passenger at an airport is acquired from the flight information, and a tour suitable for the passenger is determined based on the stay time.

(Supplementary note 35)

The computer readable recording medium according to supplementary note 34, in which, in the step of searching for the tour, a round-trip time between the airport and a tour destination is acquired and a tour for which a time obtained by subtracting the round-trip time from the stay time is a predetermined value or more is determined.

(Supplementary note 36)

The computer readable recording medium according to any one of supplementary notes 25 to 35, in which the biological information is face image data.

LIST OF REFERENCE SIGNS

1 Biological information acquisition unit
2 Flight information acquisition unit
3 Passenger determination unit
4 Sightseeing area information acquisition unit
5 Tour search unit
6 Display control unit 10 Information processing apparatus
51 Image capture device
52 Storage device
53 Display device
54 Display device
55 Passenger
61 Arrival gate
110 Computer
111 CPU
112 Main memory
113 Storage device
114 Input interface
115 Display controller
116 Data reader/writer
117 Communication interface
118 Input device
119 Display device
120 Recording medium
121 Bus

The invention claimed is:

1. An information processing apparatus comprising:
at least one memory storing instructions; and
at least one processor configured to execute the instructions to:
acquire, from a camera of a digital signage installed at an airport, biological information of a plurality of passengers who have disembarked from an aircraft and are in front of the digital signage, the biological information comprising a face image;
acquire flight information corresponding to the acquired biological information from a storage device in which the flight information of a passenger and the biological information of the passenger are stored in association with each other in advance;
determine, based on the acquired flight information, a number of re-boarding passengers among the plurality of passengers in front of the digital signage and a first nationality ratio of the plurality of passengers in front of the digital signage, and connection time information for the re-boarding passengers;
select, based on the number of re-boarding passengers and the first nationality ratio and the connection time information, one or more candidate sightseeing areas;
receive a second nationality ratio and congestion information of the one or more candidate sightseeing areas, the congestion information being calculated based on number of transactions using a facial recognition on image data captured by a camera respectively installed in the candidate sightseeing areas;
determine, based on the number of re-boarding passengers and the first nationality ratio and the second nationality ratio and the connection time information and the congestion information, one or more sightseeing areas; and
display, on a display of the digital signage, the determined one or more sightseeing areas.

2. The information processing apparatus according to claim 1, wherein,
the at least one processor is further configured to execute the instructions to:
search for a tour in which the passenger can participate using the congestion information and
the flight information if the passenger is a re-boarding passenger; and
display information of the searched-for tour on the display of the digital signage.

3. The information processing apparatus according to claim 2, wherein,
the at least one processor is further configured to execute the instructions to:
select only tours in which the congestion information is equal to or less than a predetermined value from among searched tours,
display information of the selected tour on the display of the digital signage.

4. The information processing apparatus according to claim 2,
select only tours in which the congestion information is equal to or more than a predetermined value from among searched tours,
display information of the selected tour on the display of the digital signage.

5. The information processing apparatus according to claim 2, wherein,
the at least one processor is configured to execute the instructions to:
acquire weather information of a sightseeing area of the tour,
use the weather information in addition to the degree of congestion and the flight information to search for a tour in which the passenger can participate.

6. The information processing apparatus according to claim 1, wherein,
the at least one processor configured to execute the instructions to:
detect human faces through the facial recognition in the image data captured by the camera installed at the respective candidate sightseeing areas and calculate the number of people detected per visual field of the camera as the congestion information of a sightseeing area of the tour.

7. An information processing method comprising:
acquiring, from a camera of a digital signage installed at an airport, biological information of a plurality of passengers who have disembarked from an aircraft and are in front of the digital signage, the biological information comprising a face image;
acquiring flight information corresponding to the acquired biological information from a storage device in which the flight information of a passenger and the biological information of the passenger are stored in association with each other in advance;
determining, based on the acquired flight information, a number of re-boarding passengers among the plurality of passengers in front of the digital signage and a first nationality ratio of the plurality of passengers in front of the digital signage, and connection time information for the re-boarding passengers;
select, based on the number of re-boarding passengers and the first nationality ratio and the connection time information, one or more candidate sightseeing areas;
receive a second nationality ratio and congestion information of the one or more candidate sightseeing areas, the congestion information being calculated based on number of transactions using a facial recognition on image data captured by a camera respectively installed in the candidate sightseeing areas;
determine, based on the number of re-boarding passengers and the first nationality ratio and the second nationality ratio and the connection time information and the congestion information, one or more sightseeing areas; and display, on a display of the digital signage, the determined one or more sightseeing areas.

8. A non-transitory computer readable recording medium that includes a program recorded thereon, the program including instructions that cause a computer to carry out:

acquiring, from a camera of a digital signage installed at an airport, biological information of a plurality of passengers who have disembarked from an aircraft and are in front of the digital signage, the biological information comprising a face image;

acquiring flight information corresponding to the acquired biological information from a storage device in which the flight information of a passenger and the biological information of the passenger are stored in association with each other in advance;

determining, based on the acquired flight information, a number of re-boarding passengers among the plurality of passengers in front of the digital signage and a first nationality ratio of the plurality of passengers in front of the digital signage, and connection time information for the re-boarding passengers;

selecting, based on the number of re-boarding passengers and the first nationality ratio and the connection time information, one or more candidate sightseeing areas;

receiving a second nationality ratio and congestion information of the one or more candidate sightseeing areas, the congestion information being calculated based on number of transactions using a facial recognition on image data captured by a camera respectively installed in the candidate sightseeing areas;

determining, based on the number of re-boarding passengers and the first nationality ratio and the second nationality ratio and the connection time information and the congestion information, one or more sightseeing areas; and displaying, on a display of the digital signage, the determined one or more sightseeing areas.

\* \* \* \* \*